United States Patent [19]

Taylor

[11] 4,077,328

[45] Mar. 7, 1978

[54] ROTARY DUMP

[76] Inventor: Glenn Taylor, P.O. Box 93006 Martech Station, Atlanta, Ga. 30318

[21] Appl. No.: 694,925

[22] Filed: Jun. 11, 1976

[51] Int. Cl.² .................. B61D 7/10; B61D 9/04; B61D 9/12
[52] U.S. Cl. ................ 105/261 A; 105/215 C; 105/275; 298/9; 298/17.7
[58] Field of Search ............... 105/275, 261 A, 271, 105/272, 273, 274, 215 C, 260, 263, 276, 277, 279; 74/89.2, 89.21, 89.22; 214/138 E; 298/9, 7, 17.5, 17.6, 17.7, 22 R

[56] References Cited

U.S. PATENT DOCUMENTS

| 868,278 | 10/1907 | Krasmer | 298/7 |
|---|---|---|---|
| 1,055,575 | 3/1913 | Truax | 105/275 |
| 1,432,328 | 8/1921 | Gee | 298/9 |
| 2,174,956 | 10/1939 | Allison | 298/9 |
| 2,253,548 | 8/1941 | Allison | 298/9 |
| 2,786,361 | 3/1957 | Russell | 74/89.22 |
| 2,903,145 | 9/1959 | Brinkel | 214/138 E |
| 2,997,213 | 8/1961 | Richards et al. | 298/7 X |
| 3,326,605 | 6/1967 | Steingas et al. | 298/17.7 |
| 3,584,917 | 6/1971 | Ullenberg | 298/7 |
| 3,730,105 | 5/1973 | Holley | 105/215 C |
| 3,730,591 | 5/1973 | Griffis | 105/276 |
| 3,874,306 | 4/1975 | Coons et al. | 105/215 C X |

FOREIGN PATENT DOCUMENTS

| 505,513 | 5/1939 | United Kingdom. |
|---|---|---|
| 459,977 | 1/1937 | United Kingdom ............ 105/215 |

*Primary Examiner*—Drayton E. Hoffman
*Assistant Examiner*—Carl Rowold
*Attorney, Agent, or Firm*—Jones, Thomas & Askew

[57] ABSTRACT

The load carrying vehicle includes a vehicle framework supported by road wheels, and railroad wheels are mounted on the framework and are movable up and down with respect to the framework for engaging the rails of a railroad track for supporting the vehicle from a railroad track. A load support framework is rotatably mounted on the vehicle framework about an upwardly extending axis, and a dump body is pivotally mounted on the load support framework about a horizontal axis, so that the dump body can be rotated and tilted with respect to the vehicle framework to dump its load at various positions about the vehicle. The dump body includes a bottom opening tailgate at the rear opening of the dump body, an apron hingedly connected to the dump body at the lower edge of the rear opening, and wing plates hingedly connected at each side of the rear opening of the dump body, and the wing plates and apron can be moved from closed positions folded about the tailgate to opened positions where they form a chute for guiding the load being dumped from the dump body to control the movement of the load as the vehicle travels along a railroad track.

10 Claims, 10 Drawing Figures

ROTARY DUMP

BACKGROUND OF THE INVENTION

This invention relates to a load carrying vehicle which includes a dump body rotatable about a vertical axis and tiltable about a horizontal axis.

In the past, various load carrying vehicles have been developed which include a tiltable dump body, wherein the dump body can be loaded with solid flowable materials such as dirt, gravel, etc., the vehicle moved to another site, and the dump body tilted about a horizontal axis to remove or dump the material. The prior art indicates that various dump vehicles have been conceived of in which their dump body also rotates about a vertical axis with respect to the vehicle framework so that the load carried by the vehicle can be dumped to the side of the vehicle. While such rotating dump load carrying vehicles have been disclosed in the past, it appears that vehicles of this type have not met with substantial commercial success, apparently because of various problems encountered with the construction and balance of such vehicles. For example, when the dump body of a vehicle is rotated and tilted to dump the load to the side of the vehicle, the center of gravity of the vehicle and its load is likely to be shifted to the side of the vehicle, and the center of gravity of the load may shift far enough beyond the side of the vehicle as the load is being dumped to create the hazard of having the vehicle tilt over. Moreover, if the vehicle is located on uneven terrain as its dump body is rotated and tilted, the hazard of turning over the vehicle is increased.

SUMMARY OF THE INVENTION

Briefly described, the present invention comprises a rotating dump load carrying vehicle which includes a vehicle framework supported by road wheels, and railroad wheels are mounted on the vehicle framework and are movable downwardly with respect to the vehicle for engagement with railroad tracks, whereby the vehicle can be supported by and moved along railroad tracks. A load carrying framework is rotatably mounted on the vehicle framework about an upwardly extending axis, and a dump body is tiltably mounted on the load carrying framework. A tailgate is hingedly connected to the dump body above its rear opening, an apron is hingedly connected to the dump body below its rear opening, and wing plates are hingedly connected to the dump body on opposite sides of the rear opening. The apron and wing plates are foldable from positions about the tailgate outwardly to positions in approximate alignment with the sidewalls and bottom wall of the dump body to form a chute for guiding the load being dumped from the dump body.

When the vehicle is located over railroad tracks, the railroad wheels are moved down into engagement with the railroad tracks for supporting and guiding the vehicle along the railroad tracks, and the rear driving wheels of the vehicle also engage the railroad tracks and function to move the vehicle along the tracks. When a load of flowable solid material is to be dumped from the dump body of the vehicle, the dump body can be rotated about its upwardly extending axis so as to position the dump opening of the dump body out to the side of the railroad tracks, the chute for guiding the load is formed by the apron and wing plates, the tailgate is opened, and the dump body is tilted to being the flow of material. The relatively rigid support provided by the railroad tracks and the railroad wheels of the vehicle provide a stable support for the vehicle during the dumping operation, and the chute formed by the apron and wing plates at the dump opening of the dump body allow the load to be dumped beyond the ballast of the railroad tracks, if desired. The wing plates prevent the load from sliding off the side edges of the apron as the load is being dumped from the dump body, and the vehicle can be driven along the railroad track as the load is being dumped so that the load can be spread over a large area beside the railroad track.

Thus, it is an object of this invention to provide a load carrying vehicle that is movable along a railroad track and that can spread a load of flowable material on opposite sides of the railroad track, beyond the ballast of the railroad track.

Another object of this invention is to provide a rotatable and tiltable dump load carrying vehicle which is safe to operate and which provides means for dumping a load to the side of the path of the movement of the vehicle.

Another object of this invention is to provide a rotating dump which is inexpensive to construct and maintain and which is convenient and safe to operate and which can be operated on a railroad track as well as on road surfaces and the like.

Other objects, features and advantages of the present invention will become apparent from reading the following specification, when taken in conjunction with the accompanying drawings.

DETAILED DESCRIPTION

Figure 1:
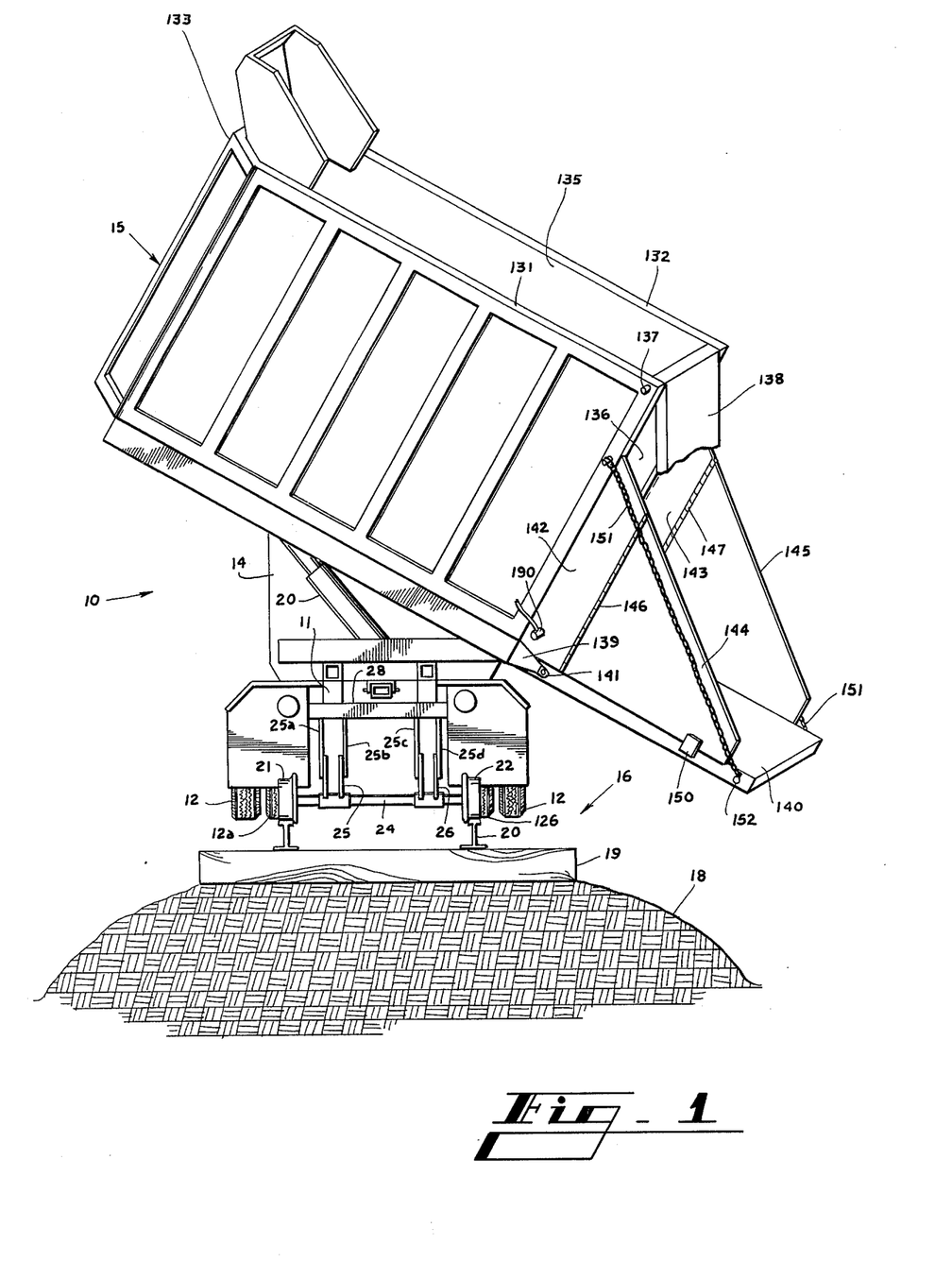
FIG. 1 is a rear view of the vehicle mounted on a railroad track, with the dump body rotated and tilted and with the tailgate, apron and wing plates open.

Referring now in more detail to the drawing, in which like numerals indicate like parts throughout the several views, FIG. 1 illustrates the rotating dump load carrying vehicle 10 which includes a vehicle framework 11, ground engaging wheels 12 mounted on the framework, a passenger cab 14, and a dump body 15. The vehicle 10 is illustrated as being mounted on and driven on a railroad track 16 which includes a ballast 18, crossties 19 and rails 20. A pair of railroad wheels 21 and 22 are located at the rear of the vehicle 10 and support the vehicle from the railroad track 16, while the inner road engaging wheels 12a and 12b also engage the rails 20 and function to move the vehicle 10 along the length of the railroad track. An additional pair of railroad wheels (not shown in FIG. 1) are mounted on the vehicle frame 11 at the front portion of the vehicle ahead of the front steerable wheels (not shown) of the vehicle and support and guide the front portion of a vehicle along the railroad track. The front pair and rear pair of railroad wheels are each mounted on a common axle, such as axle 24 of the rear pair of wheels 21 and 22. Each axle is connected by a linkage system adjacent its ends to the vehicle framework 11. The linkage system for the rear axle 24 comprises two pairs of identical linkages 25 and 26, with each pair being positioned on and connected to the axle 24 adjacent the railroad guide wheels 21 and 22. The upper ends of the pairs of linkages 25 and 26 are suspended from mounting plate 28, which mounting plate 28 is connected to the vehicle framework 11. The pairs of support linkages 25 and 26 comprise identical link assemblies 25a, 25b, 25c, and 25d.

Figure 4A:
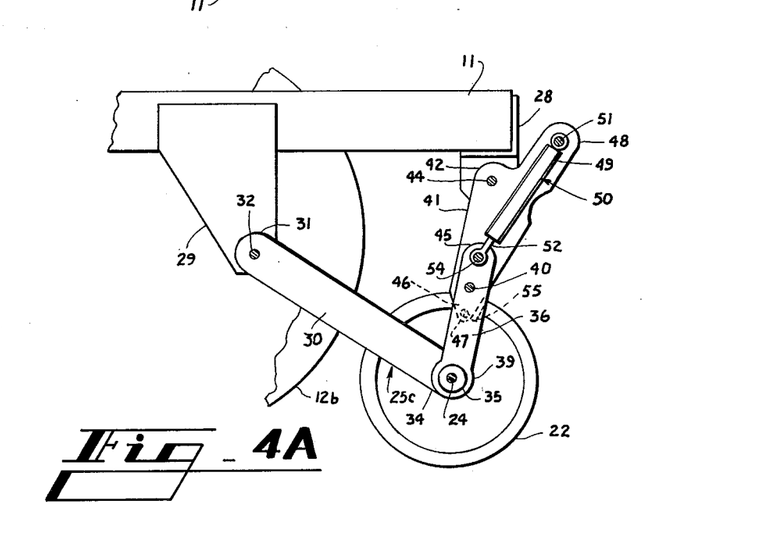
FIG. 4A is a side view of a rear railroad wheel and its support linkages, showing the railroad wheel in its down position.
Figure 4B:
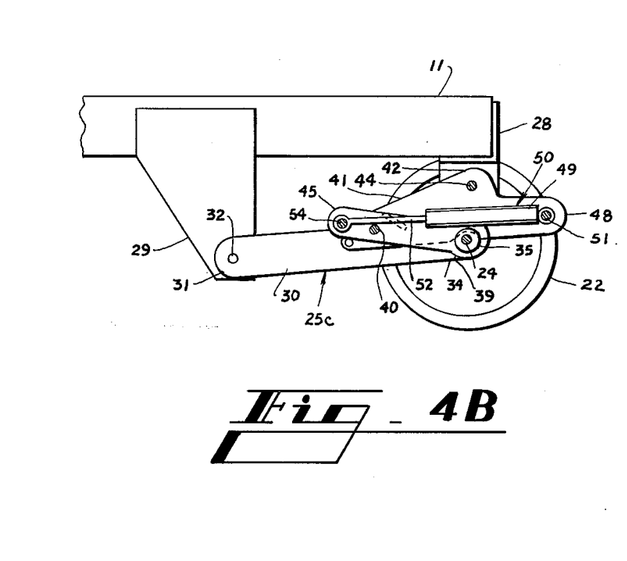
FIG. 4B is a side view of the linkage of FIG. 4A, showing the linkage in its up or retracted position.
Figure 4C:
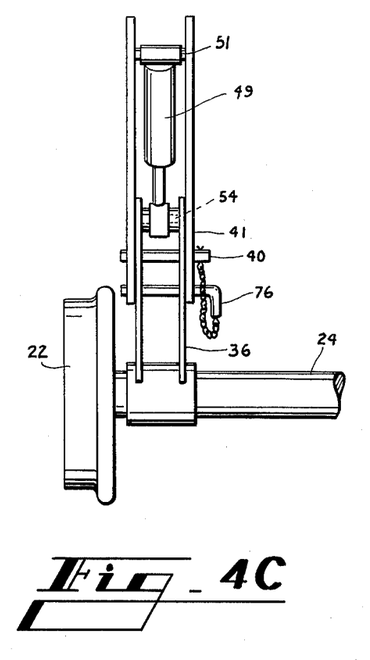
FIG. 4C is a rear view of the linkage of the FIG. 4A, showing the railroad wheel in its down position.

FIGS. 4A, 4B and 4C illustrate link assembly 25c. A support bracket 29 is rigidly connected to the vehicle framework 11, and support bracket 29 together with mounting plate 28 suspend the pair of railroad wheels 21 and 22 beneath the vehicle. Trailing guide link 30 has its leading end portion 31 pivotally connected to bracket 29 by means of pivot pin 32, and its lower or rear end portion 34 includes cylindrical bearing 35 extending about the axle 24 of the railroad guide wheels 21 and 22. The lower load bearing link 36 is rotatably connected at its lower end 38 by means of bearing 39 to the bearing 35 of the trailing guide link 30 and to the axle 24. The lower load bearing link 36 is rectilinear and is connected at a position intermediate its ends to pivot pin 40. Pivot pin 40 is also connected to the upper load bearing link 41. The upper load bearing link 41 is pivotally connected adjacent its upper end 42 to the mounting plate 28 by means of pivot pin 44. The pivot pin 40 is located below the upper end or extension 45 of the lower load bearing link 36 and below the lower end or extension 46 of the upper load bearing link 41. Upper load bearing link 46 also includes offset projection 48 which projects rearwardly and upwardly from the upper end 42 of the link. A ram is located between the pairs of support linkages 25a and 25b, and between the linkages 25c and 25d. The ram 49 of FIG. 4A includes a cylinder 50 supported at its upper end by connecting pin 51 which extends between the adjacent ones of the support linkages in each pair of support linkages, and a ram rod 52 movable out of and into the cylinder 50 and connected to the connecting pin 54. Connecting point 54 extends between the adjacent lower load bearing links 36. A stop strap 55 is rigidly welded to the adjacent lower load bearing links 36 to prevent excessive movement of the links with respect to one another.

It will be noted that the connecting pin 54 which extends between the adjacent lower load bearing links 36 and is connected to the ram 50 is forwardly offset from between the upper connecting pin 51 and the pivot pin 40, so that when the ram 49 distends its ram rod 52, the lower load bearing link 36 will tend to rotate about the pivot pin 40 in a counterclockwise direction, which causes the pair of support linkages to fold together to the position illustrated in FIG. 4B, where the railroad guide wheel 22 is lifted with respect to the vehicle framework out of engagement with the railroad track. When the ram rod 52 is retracted, the reverse movement occurs, wherein the upper and lower load bearing links 41 and 36 unfold with respect to each other and move the railroad guide wheel 22 back down toward engagement with the railroad track. The stop strap 55 which is rigidly connected at its ends to the lower load bearing links 36 prevents the upper and lower load bearing links from unfolding any further than the position illustrated in FIG. 4A.

Figure 5A:
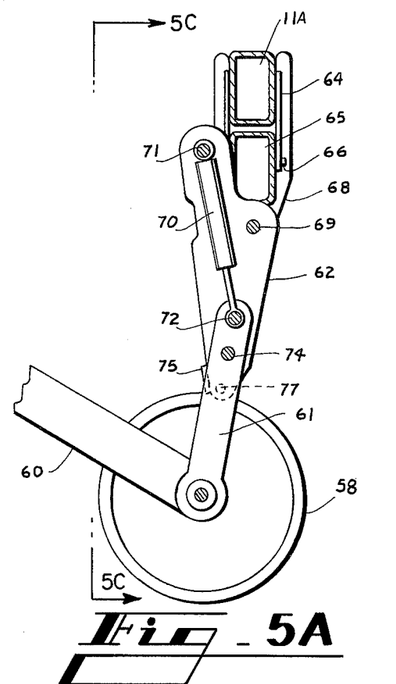
FIG. 5A is a side view of a front railroad wheel and its support linkages, showing the railroad wheel in its down position.
Figure 5B:
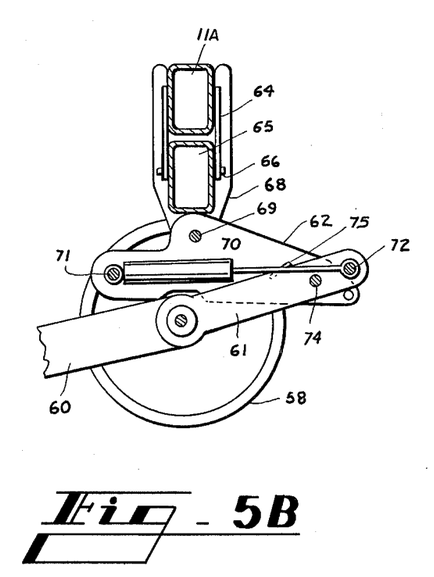
FIG. 5B is a cross section through the longitudinal center line of the vehicle, showing a side view of the linkage of FIG. 5A, showing the linkage in its up or retracted position with the inside link plates removed to illustrate the ram position.
Figure 5C:
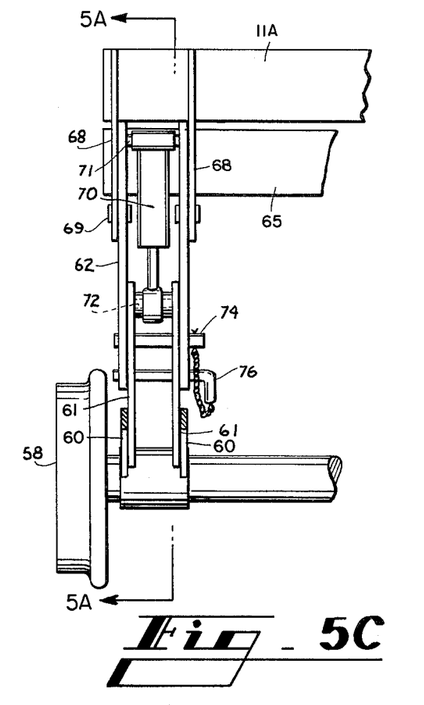
FIG. 5C is a front view of the linkage of FIG. 5A at one end of the forward wheel assembly, showing the railroad wheel in its down position.

The forward railroad guide wheels such as the wheel 58 of FIGS. 5A, 5B and 5C are positioned in front of the front steerable road wheels 59 of the vehicle and the pairs of support linkages for the front railroad guide wheels are assembled approximately in the same arrangement as the rear linkages. Each linkage includes a guide link 60, a lower load bearing link 61, and an upper load bearing link 62. These links are virtually identical to the links used for the rear of the vehicle except that the upper load bearing link 62 is reversed. A clevis 64 is rigidly mounted on transverse frame element 11A of the vehicle framework 11, and a cross support 65 is pivotally supported by the clevis below frame element 11A by pivot pin 66 which extends parallel to the center line of the vehicle. The cross support 65 is therefore movable about the pivot pin 66 with respect to the vehicle framework element 11A. Mounting brackets 68 are rigidly connected to the cross support 65 and extend up on opposite sides of frame element 11A to slidably receive the frame element and prevent the cross support from moving about a vertical axis, and the upper load bearing link 62 of each linkage is pivotally connected by its pivot pin 69 to the mounting brackets 68. Ram 70 is connected between the connecting pins 71 and 72, and the lower and upper load bearing links 61 and 62 are pivotally connected together by pivot pin 74. Since the connecting pin 72 for ram 70 is positioned slightly ahead of pivot pin 74 and connecting pin 71, the distension of ram 70 causes the upper and lower load bearing links 62 and 61 to fold with respect to each other about the pivot pin 74 and assume the position illustrated in FIG. 5B, where the forward railroad guide wheel 58 is retracted upwardly with respect to the vehicle framework and out of engagement with the railroad track. Also, when the ram 70 is retracted, the links 61 and 62 unfold with respect to each other back to the position illustrated in FIG. 5A until the lower extension of the upper load bearing link 62 engages the stop strap 75.

When the railroad guide wheels are in their down positions and are in engagement with the railroad tracks and function to support the vehicle, the axles of the railroad guide wheels and the pivot pins of the load bearing links will be substantially in alignment with one another so that only small folding forces will be applied to the links. Moreover, the stop straps of the assembly will prevent the links from moving in one direction. To prevent the links from moving in the opposite direction, aligned openings, such as openings 47 in FIG. 4A and openings 77 in FIG. 5A, are formed in the load bearing links, and a locking pin 76 is inserted through the aligned openings to prevent inadvertent collapse of the system.

Figure 2:
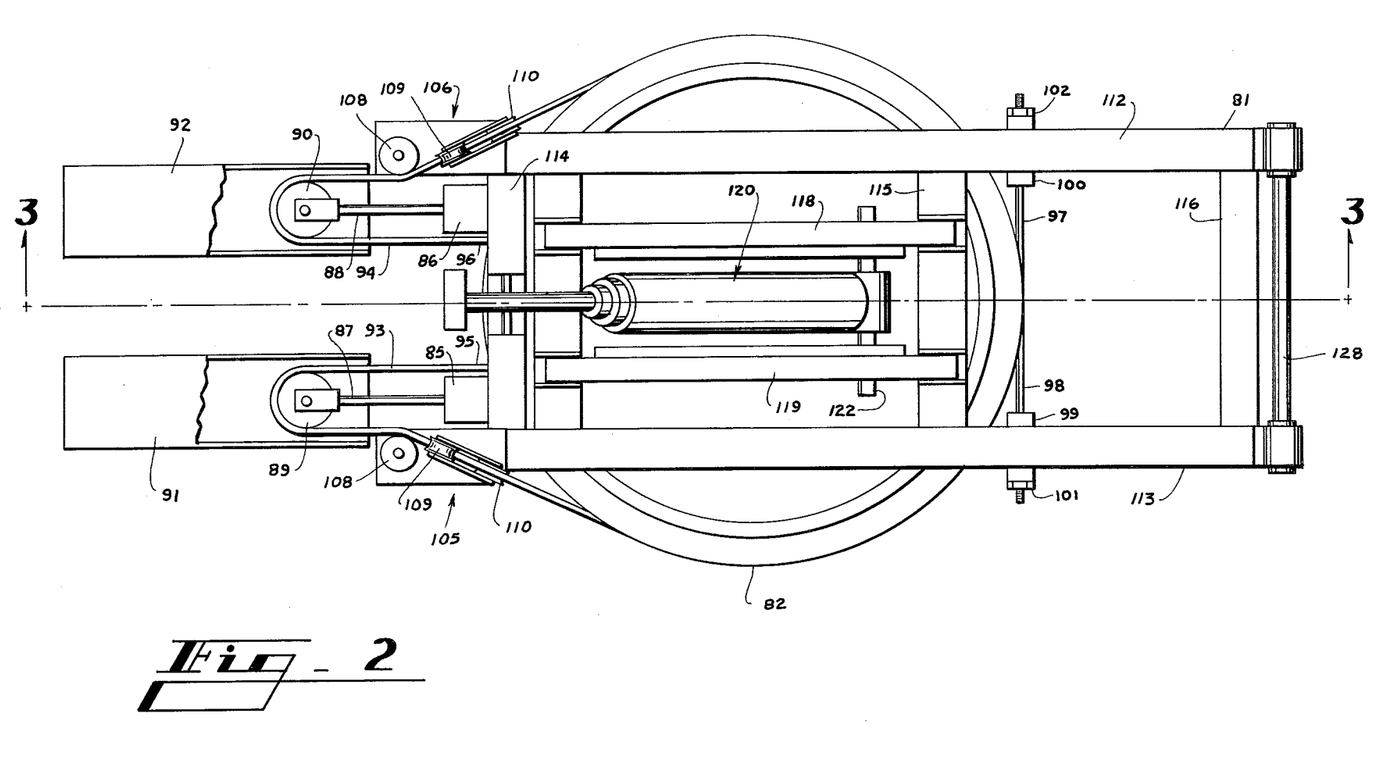
FIG. 2 is a top view of the load carrying framework of the dump cylinder, the dump body turn cylinders and cable system.
Figure 3:
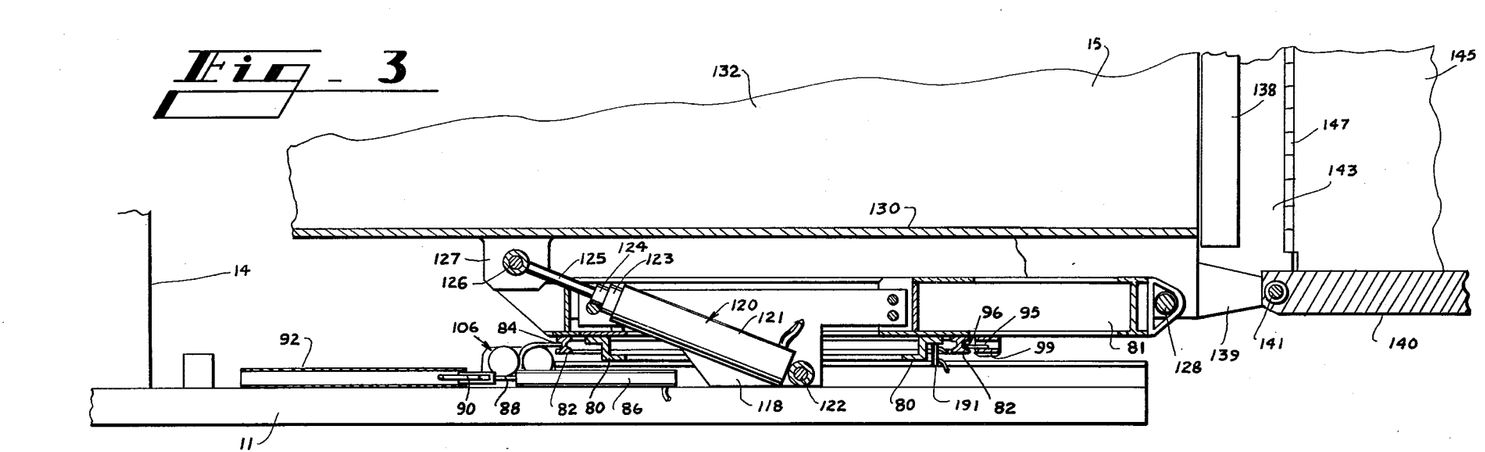
FIG. 3 is a side view of the vehicle framework and the load carrying framework and of a portion of the dump body, taken along lines 3—3 of FIG. 2.

As illustrated in FIG. 3 annular bearing 80 is bolted to the vehicle framework and a load support framework 81 is rotatably mounted on the annular bearing. An annular dump sheave 82 is rigidly connected to the load support framework 81 and includes an annular track 84 for receiving a cable. A pair of hydraulic rams 85 and 86 (FIG. 2) are mounted beneath the annular bearing 80 and sheave 84 and are oriented in side-by side horizontal, parallel relationship with their ramrods 87 and 88 extending in a forward direction with respect to the vehicle. Ram sheaves 89 and 90 are carried by the ends of the ramrods 87 and 88, and cable housings 91 and 92 are positioned in alignment with the movement of the ramrods 87 and 88 and receive the ram sheaves 89 and 90 when the rams are distended. Cables 93 and 94 have their ends 95 and 96 fastened to the vehicle framework and extend in a forward direction about the ram sheaves 89 and 90, then rearwardly and in an opposite direction about the dump sheave 82, and are connected at their rear ends 97 and 98 to the adjustment tubes 99 and 100 attached to the load support framework 81. The tension in the cables 93 and 94 is adjusted by rotating the adjustment nuts 101 and 102 on the threaded ends 97 and 98 of the cables 93 and 94.

Since the rams 85 and 86 are located at a level below the dump sheave 82, it is necessary to guide the cables 93 and 94 from the lower level of the rams 85 and 86 to a higher level of the dump sheave 82. Pulley assemblies 105 and 106 are positioned adjacent each ram 85 and 86, and each pulley assembly includes an alignment pulley 108, an elevator pulley 109, and a guide pulley 110. The alignment pulley 108 is located at a position where it requires the cable to extend rearwardly from the ram pulley. The elevator pulley 109 receives the cable as it extends from the alignment pulley 108, and the cable extends through an arc upwardly from the elevator pulley toward the upper periphery of the guide pulley 110. The elevator pulley 109 and the guide pulley 110 extend on a line of tangency with respect to the dump sheave 82. Thus, the pulley assemblies 105 and 106 elevate the cables 95 and 94 and direct the cables at a tangent with respect to the dump sheave 82 and the ram pulleys 89 and 90, which allows the rams 85 and 86 to be located beneath the ram sheave 82 and the bearing 80.

As illustrated in FIG. 2, the load support framework 81 is rectangular and includes side beams 112 and 113, and front, intermediate and rear braces 114, 115 and 116 extending between the side beams. A pair of brackets 118 and 119 are mounted on front brace 114 and intermediate brace 115 and extend down into the annular bearing 80 and dump sheave 82. Dump ram 120 is positioned between the brackets 118 and its cylinder 121 has its end pivotally supported by the pivot pin 122. Ram 120 is a multiple stage ram and includes the outer cylinder 121, intermediate cylinder 123, and inner cylinder 124. Ramrod 125 extends outwardly from the inner cylinder 123. The connecting pin 122 extends through and is supported adjacent its end by the pair of brackets 118, and the ram 120 is inclined upwardly from the connecting pin. The ramrod 125 is connected at its outer end to the forward end of the dump body 15 by connecting pin 126 and brackets 127. The other end of the dump body 15 is connected to the load support framework 81 by the dump pivot axle 128 which extends through aligned openings formed in the load support framework 81 and the dump body 15.

As is illustrated in FIGS. 1 and 3, the dump body 15 includes a bottom wall or dump pan 130, side walls 131 and 132 which are located on opposite sides of the bottom wall 130 and extend upwardly therefrom, and front wall 133 that extends upwardly from the forward edge of the bottom wall. The side walls, front wall and bottom wall all define a top opening 135 which is normally open and a rear dump opening 136 at the rear of the dump body. A tailgate 138 is hingedly connected to the dump body at the upper portion of the rear opening so that it functions as a bottom opening door. A bottom wall extension 139 extends beyond the rear opening 136 of the dump body, and apron 140 is hingedly connected to the extension 139 at the lower edge of the dump opening 136 by pivot pin 141. Side extensions 142 and 143 extend rearwardly from the side walls 131 and 132, and wing plates 144 and 145 are hingedly connected to the side extensions 142 and 143 by upwardly extending hinges 146 and 147. The hinge pin 141 of the apron 140 is displaced rearwardly from the hinge pin 137 of the tailgate 130, and the hinges 146 and 147 of the wing plates 144 and 145 are displaced rearwardly from the hinge pin 141 of the apron 140. The arrangement of the hinge structures of the tailgate, apron and wing plates is such that when the dump body 15 is let down to its normal untilted attitude, the tailgate 138 will close the rear opening 136 of the dump body, apron 140 can be folded up to a closed position behind the tailgate 138, and wing plates 144 and 145 can be folded inwardly to a closed position about the apron 140. When the load carried by the dump body is to be dumped, the wing plates 144 and 145 will be swung open, and the apron 140 will be pivoted down. Tabs 150 are connected to the apron 140 on opposite sides thereof to engage the wing plates 144 and 145, to hold the wing plates at the edges of the apron 140. Chains 151 are each connected at one of their ends to the dump body and are insertable in a chain opening 152 adjacent the outer end of apron 140 to hold the apron in a fixed, outwardly extending attitude with respect to the dump body. Thus, the wing plates 144 and 145 and apron 140 can be opened out to the configuration illustrated in FIG. 1 to form a chute for guiding and controlling the load being dumped from the dump body 15.

In the meantime, as the chute is being formed by the wing plates and apron, the tailgate 138 can remain closed. When the load is to be dumped from dump body by tilting the dump body, the tailgate 138 can be unlocked, and when the dump body is tilted, the load will be free to move on down through the inclined chute at the rear of the dump body.

Figure 6:
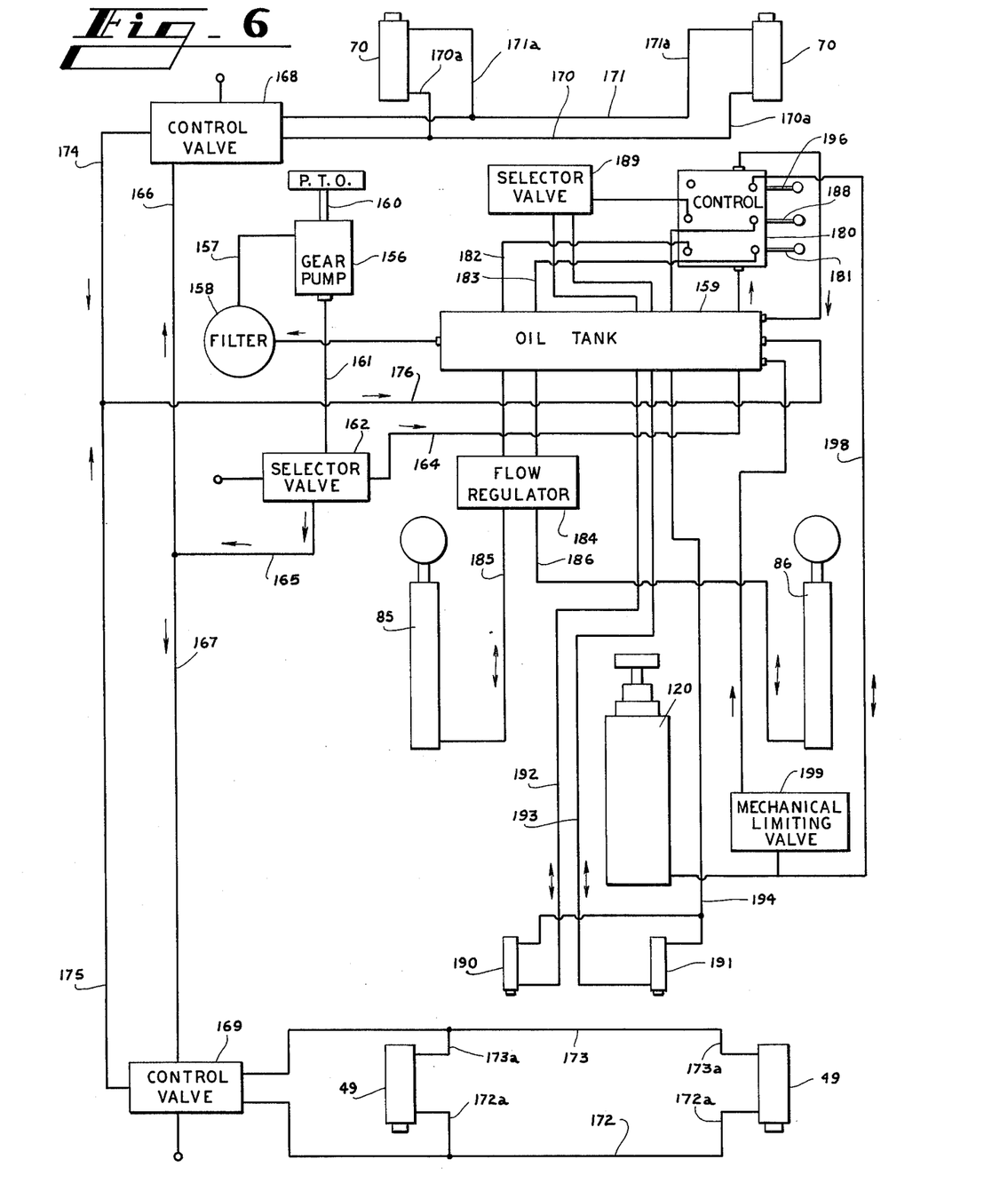
FIG. 6 is a schematic illustration of the hydraulic control system for the vehicle.

The hydraulic system for controlling the rotating dump load carrying vehicle is disclosed in schematic form in FIG. 6. A gear pump 156 has its inlet in communication through conduit 157 and through filter 158 with reservoir 159. The pump 156 is driven by the power takeoff 160 from the engine of the vehicle, and the outlet conduit 161 from the pump 156 communicates with selector valve 162. Selector valve 162 is a two position valve which directs the fluid from conduit 161 through conduit 164 or through conduit 165. Selector valve 162 is located in the passenger cab of the vehicle, and when the selector valve has been manipulated to direct the fluid flow through conduit 165, no fluid flows through conduit 164.

Conduit 165 from selector valve 162 communicates with conduits 166 and 167, and these conduits communicate with control valves 168 and 169. Control valves 168 and 169 are located at the front and rear of the vehicle and are two position valves that can be manipulated to operate the double acting railroad wheel rams 49 and 70 to raise and lower the railroad guide wheels of the vehicle. Control valve 168 communicate with rams 70 at the front of the vehicle through conduits 170, 171 and branch conduits 170a and 171a. Control valve 169 communicates with the double-acting rams 149 through conduits 172 and 173 and through branch conduits 172a and 173a. Return flow conduits 174 and 175 communicate with the low pressure openings of control valves 168 and 169 and with conduit 176 which communicates with reservoir 159. The arrangement of the hydraulic circuit when selector valve 162 is in a position to pressurize conduit 165 allows the operator of the vehicle to move to the front of the vehicle and manipulate control valve 168 to raise and lower the front railroad guide wheels of the vehicle, and then move to the rear of the vehicle and manipulate valve 169 to raise and lower the rear railroad guide wheels. When the operator has adjusted the railroad guide wheels of the vehicle, he can move back to the cab and shift selector valve 162 to its alternate position to operate the rest of the hydraulic system.

When selector valve 162 is shifted so as to pressurize conduit 164, a flow of liquid passes to the control valve 180 in the passenger cab of the vehicle. Valve 180 is a multiple valve and its first valve element 181 controls the flow of fluid to the single acting rotating rams 85 and 86 through conduits 182, 183, flow regulator 184, and conduits 185 and 186. When one of the rams 85 or 86 is being distended by the flow of fluid from valve 181, the opposite ram 86 or 85 is being retracted by the action of the cables 94 and 95.

The second valve element 188 communicates with selector valve 189 and with tailgate lock ram 190 and center pin lock ram 191 through conduits 192, 193 and 194. The selector valve 189 allows pressurized fluid to communicate with one or other of the rams 190 or 191, or with both rams 190 and 191 simultaneously, so that the tailgate can be locked and unlocked or the load carrying framework of the dump body can be locked and unlocked.

Control valve element 196 controls the distension of dump ram 120 through conduit 198. Mechanical limiting valve 199 communicates with conduit 198 and functions mechanically to bypass the flow of fluid through conduit 198 away from dump ram 120 after the dump body has been tilted to a predetermined angle, so as to avoid tilting the dump body too high.

It will of course be understood that the particular embodiments of the invention here chosen are by way of illustration only and are meant to be in no way restrictive; therefore, numerous changes and modifications may be made and the full use of equivalents resorted to without departing from the spirit or scope of the invention as defined in the appended claims.

I claim:

1. A load carrying vehicle comprising a framework, road wheels mounted on said framework for supporting said framework from a road surface railroad wheels mounted on said framework and movable up and down with respect to said framework for engaging the rails of a railroad and supporting said framework from a railroad, a load carrying dump body mounted on said framework, means for tilting said load carrying dump body about an approximately horizontal axis and dumping the load from said dump body, means for rotating said load carrying dump body about an approximately vertical axis for dumping the load from said dump body at various positions about the vehicle, said load carrying dump body comprising a bottom pan, sidewalls extending upwardly on opposite sides of said bottom pan and a front wall extending upwardly from said bottom pan defining an upper opening and a dump opening, a tail gate hingedly connected at its upper edge portion about an approximately horizontal axis to the upper portions of said sidewalls at the upper portion of the dump opening and movable to open and close the dump opening, an apron connected at one of its edge portions to the lower portion of said dump body at the lower edge of the dump opening, and a pair of wing plates each connected at one of its edge portions to one of said side walls at the side edges of the dump opening, whereby when the railroad wheels are engaged with the rails of a railroad, the load dumped from the dump body can be directed out to the side of the rails of the railroad by the apron and wing plates.

2. The load carrying vehicle of claim 1 and wherein said apron and said wing plates are movable with respect to each other from overlapping folded positions with respect to each other behind said load carrying dump body to positions extended from said dump body to form a load discharge chute, and wherein said tail gate is movable between opened and closed positions with respect to said load carrying dump body when the load discharge chute is formed by said apron and wing plates.

3. The load carrying vehicle of claim 1 and further including a pair of ram members positioned beneath said load carrying dump body and operative to rotate said dump body.

4. The load carrying vehicle of claim 1 and further including fluid powered ram means for moving said railroad wheels up and down with respect to said framework, and means for locking said railroad wheels in their down positions.

5. The load carrying vehicle of claim 1 and wherein said railroad wheels comprise a pair of railroad wheels at the rear portion of said vehicle and a pair of railroad wheels at the front portion of said vehicle, said pair of railroad wheels at the front of said vehicle being pivotal about an axis approximately parallel to the direction of movement of the vehicle along a railroad.

6. The load carrying vehicle of claim 1 and wherein said railroad wheels comprise a pair of wheels positioned at the front of said vehicle and a pair of wheels positioned at the rear of said vehicle, and wherein each pair of railroad wheels are mounted on said vehicle by a collapsible linkage, each of said collapsible linkages comprising a guide link with one end portion pivotally connected to said framework and its other end portion connected to said pair of wheels, an upper load bearing link pivotally connected to said framework, a lower load bearing link pivotally connected at a position intermediate its ends to said upper load bearing link and connected at its lower end to said pair of wheels, a ram connected at one of its ends to said upper load bearing link at a position offset from between the connections of said upper load bearing link to said framework and to said lower load bearing link and connected at its other end to the upper end of said lower load bearing link, whereby distention of said ram folds said upper and lower load bearing links together and lifts said pair of railroad wheels with respect to said framework and retraction of said ram folds said upper and lower load bearing links outwardly and lowers said pair of railroad wheels with respect to said framework.

7. A load carrying vehicle comprising a framework, road wheels mounted on said framework for supporting said framework from a road surface and the like, railroad wheels mounted on said framework and movable up and down with repsect to said framework for engaging the rails of a railroad and supporting said framework from a railroad, a load carrying dump body mounted on said framework, means for tilting said load carrying dump body about an approximately horizontal axis and dumping the load from said dump body, chute means extending from the rear portion of said dump body for displacing the point of discharge of the load from the dump body, and means for rotating said load carrying dump body about an approximately vertical axis comprising bearing means mounted on said framework and rotatably supporting said load carrying dump body, a sheave member connected to and rotatable about the approximately vertical axis with said dump body, ram means including a ramrod positioned beneath said bearing means, a pulley member carried by said ram rod, a cable with one of its ends movable with said dump body about the approximately vertical axis and the other of its ends connected to said framework and extending about an arc of said sheave member and said pulley member, and guide means for guiding said cable between the levels of said ram means and said sheave member, whereby distension of said ramrod causes the dump body to rotate about the approximately vertical axis for dumping a load from the dump body at various positions about the vehicle.

8. A load carrying vehicle comprising a vehicle framework, a load support framework rotatably mounted on said vehicle framework about an upwardly extending axis, a dump body pivotally mounted on said load support framework about an approximately horizontal axis, means for tipping said dump body about said horizontal axis, said dump body including a bottom pan and front and side walls extending upwardly from said bottom pan and defining a rear opening for dumping its load, a bottom opening tail gate hingedly connected about an approximately horizontal axis to the upper portions of said side walls for selectively opening and closing the rear opening of said dump body, an apron hingedly connected about an approximately horizontal axis to the lower portion of said dump body at a position below the rear opening of said dump body, a pair of wing plates each hingedly connected at one of its edge portions about an upwardly extending axis at opposite sides of the rear opening of said dump body, and railroad wheels mounted on said vehicle framework and movable up and down with respect to said vehicle framework for engaging the rails of a railroad and supporting the vehicle on a railroad, whereby said tail gate, apron and wing plates are all foldable with respect to each other inwardly into closed relationship about the rear opening of said dump body and the dump body is rotatable about its upwardly extending axis and the tail gate, apron and wing plates are foldable outwardly to form a chute to guide the load of the dump body out to the side of the rails of a railroad as the load is dumped.

9. The load carrying vehicle of claim 8 and wherein said apron and wing plates are foldable about said tail gate whereby said apron and wing plates can be unfolded with respect to each other to form a chute while the tail gate remains closed and holds the load in the dump body.

10. A load carrying vehicle comprising a vehicle framework, road wheels mounted on said vehicle framework for supporting said vehicle framework from a road surface and the like, railroad wheels mounted on said vehicle framework and movable up and down with respect to said vehicle framework for engaging the rails of a railroad and supporting the vehicle framework from a railroad, a load support framework, bearing means rotatably supporting said load support framework about an upwardly extending axis, a sheave member connected to said load support framework with its center of rotation concentric with the upwardly extending axis, a first cable connected at one of its ends to said load support framework and extending in a first direction about said sheave member, a second cable connected at one of its ends to said load support framework and extending in a second direction about said sheave member, a pair of fluid actuated rams positioned in parallel, side-by-side relationship beneath said sheave member and each including ram rods distendable from a cylinder, said first and second cables each being engaged at the other of its ends by one of said ram rods, guide means for each of said first and second cables for guiding said cables from the level of said rams to the level of said sheave member, cable housings for receiving each of said cables and said ram rods when said ram rods are distended, a dump body pivotally mounted on said load support framework about a horizontal axis, means for tilting said dump body about said horizontal axis, and chute means connected to said dump body for displacing the point of discharge of the load from the dump body.

* * * * *

REEXAMINATION CERTIFICATE (473rd)
United States Patent [19]
Taylor

[11] B1 4,077,328
[45] Certificate Issued Mar. 18, 1986

[54] ROTARY DUMP

[76] Inventor: Glenn Taylor, P.O. Box 93006 Martech Station, Atlanta, Ga. 30318

Reexamination Request:
No. 90/000,644, Oct. 4, 1984

Reexamination Certificate for:
Patent No.: 4,077,328
Issued: Mar. 7, 1978
Appl. No.: 694,925
Filed: Jun. 11, 1976

[51] Int. Cl.$^4$ .................. B61D 7/10; B61D 9/04; B61D 9/12; B61F 13/00; B60P 1/30
[52] U.S. Cl. .................. 105/261 A; 105/215 C; 105/275; 298/9; 298/17.7
[58] Field of Search .................. 193/4, 5, 17; 414/470; 222/166; 105/215 C

[56] References Cited

U.S. PATENT DOCUMENTS

| | | | |
|---|---|---|---|
| 655,179 | 8/1900 | Allen | 105/254 |
| 781,175 | 1/1905 | Barrett | 105/275 |
| 868,278 | 10/1907 | Krasmer | 298/7 |
| 1,055,575 | 3/1913 | Truax | 105/275 |
| 1,432,328 | 10/1922 | Gee | 298/9 |
| 1,536,642 | 5/1925 | Wall | 193/5 X |
| 2,174,956 | 10/1939 | Allison | 298/9 |
| 2,253,548 | 8/1941 | Allison | 298/9 |
| 2,573,714 | 11/1951 | Karl | 193/5 |
| 2,678,121 | 2/1951 | Phillips | 193/4 |
| 2,786,361 | 3/1957 | Russell | 74/89.22 |
| 2,903,145 | 9/1959 | Brukel | 414/744 R X |
| 2,997,213 | 8/1961 | Richards et al. | 222/610 |
| 3,269,331 | 8/1966 | Thompson | 105/215 C |
| 3,326,605 | 6/1967 | Stringas et al. | 298/17.7 |
| 3,344,939 | 10/1967 | Shekels | 222/144.5 |
| 3,584,917 | 6/1971 | Ullenberg | 298/7 |
| 3,653,332 | 4/1972 | Olson et al. | 105/215 C |
| 3,730,105 | 5/1973 | Holley | 105/215 C |
| 3,730,591 | 5/1973 | Griffes | 298/17.6 |
| 3,874,306 | 4/1975 | Coons et al. | 105/215 C X |

FOREIGN PATENT DOCUMENTS

459977  1/1937  United Kingdom ........... 105/215 C
505513  5/1939  United Kingdom .

*Primary Examiner*—Randolph A. Reese

[57] ABSTRACT

The load carrying vehicle includes a vehicle framework supported by road wheels, and railroad wheels are mounted on the framework and are movable up and down with respect to the framework for engaging the rails of a railroad track for supporting the vehicle from a railroad track. A load support framework is rotatably mounted on the vehicle framework about an upwardly extending axis, and a dump body is pivotally mounted on the load support framework about a horizontal axis, so that the dump body can be rotated and tilted with respect to the vehicle framework to dump its load at various positions about the vehicle. The dump body includes a bottom opening tailgate at the rear opening of the dump body, an apron hingedly connected to the dump body at the lower edge of the rear opening, and wing plates hingedly connected at each side of the rear opening of the dump body, and the wing plates and apron can be moved from closed positions folded about the tailgate to opened positions where they form a chute for guiding the load being dumped from the dump body to control the movement of the load as the vehicle travels along a railroad track.

B1 4,077,328

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6–8 and 10 are determined to be patentable as amended.

Claims 2–5 and 9 dependent on an amended claim are determined to be patentable.

1. A load carrying vehicle comprising a framework, road wheels mounted on said framework for supporting said framework from a road surface, railroad wheels mounted on said framework and movable up and down with respect to said framework for engaging the rails of a railroad and supporting said framework from a railroad, a load carrying dump body mounted on said framework, means for tilting said load carrying dump body about an approximately horizontal axis and dumping the load from said dump body, means for rotating said load carrying dump body about an approximately vertical axis for dumping the load from said dump body at various positions about the vehicle, said load carrying dump body comprising a bottom pan, sidewalls extending upwardly on opposite sides of said bottom pan and a front wall extending upwardly from said bottom pan defining an upper opening and a dump opening, a tail gate hingedly connected at its upper edge portion about an approximately horizontal axis to the upper portions of said sidewalls at the upper portion of the dump opening and *its lower edge portion being* movable to open and close the dump opening, an apron connected at one of its edge portions to the lower portion of said dump body at the lower edge of the dump opening, and a pair of wing plates each connected at edges of the dump opening *with the lower edge portion of said tail gate movable over said apron and between said wing plates,* [whereby] *said apron and wing plates being constructed so that* when the railroad wheels are engaged with the rails of a railroad *the dump body can be rotated to direct the dump opening toward the side of the rails and the dump body can be tilted and* the load dumped from the dump body can be [directed] *displaced* out [to] *beyond* the side of the rails of the railroad by the apron and wing plates.

6. [The load carrying vehicle of Claim 1 and wherein] *A load carrying vehicle comprising a framework, road wheels mounted on said framework for supporting said framework from a road surface, railroad wheels mounted on said framework and movable up and down with respect to said framework for engaging the rails of a railroad and supporting said framework from a railroad,* said railroad wheels [comprises] *comprising* a pair of wheels positioned at the front of said vehicle and a pair of wheels positioned at the rear of said vehicle, and wherein each pair of railroad wheels [are] *is* mounted on said vehicle by a collapsible linkage, each of said collapsible linkages comprising a guide link with one end portion pivotally connected to said framework and its other end portion connected to said pair of wheels, an upper load bearing link pivotally connected to said framework, a lower load bearing link pivotally connected at a position intermediate its ends to said upper load bearing link and connected at its lower end to said pair of wheels, a ram connected at one of its ends to said upper load bearing link at a position offset from between the connections of said upper load bearing link to said framework and to said lower load bearing link and connected at its other end to the upper end of said lower load bearing link, whereby distention of said ram folds said upper and lower load bearing links together and lifts said pair of railroad wheels with respect to said framework and retraction of said ram folds said upper and lower load bearing links outwardly and lowers said pair of railroad wheels with respect to said framework, *a load carrying dump body mounted on said framework, means for tilting said load carrying dump body about an approximately horizontal axis and dumping the load from said dump body, means for rotating said load carrying dump body about an approximately vertical axis for dumping the load from said dump body at various positions about the vehicle, said load carrying dump body comprising a bottom pan, sidewalls extending upwardly on opposite sides of said bottom pan and a front wall extending upwardly from said bottom pan defining an upper opening and a dump opening, a tail gate hingedly connected at its upper edge portion about an approximately horizontal axis to the upper portions of said sidewalls at the upper portion of the dump opening and movable to open and close the dump opening, an apron connected at one of its edge portions to the lower portion of said dump body at the lower edge of the dump opening, and a pair of wing plates each connected at one of its edge portions to one of said side walls at the side edges of the dump opening, whereby when the railroad wheels are engaged with the rails of a railroad, the load dumped from the dump body can be directed out to the side of the rails of the railroad by the apron and wing plates.*

7. A load carrying vehicle comprising a framework, road wheels mounted on said framework for supporting said framework from a road surface and the like, railroad wheels mounted on said framework and movable up and down with [repsect] *respect* to said framework for engaging the rails of a railroad and supporting said framework from a railroad, a load carrying dump body mounted on said framework, *said dump body defining a rear opening,* a tail gate hingedly mounted at its upper portion to said dump body with its lower portion movable with respect to said rear opening to open and close said rear opening, means for rotating said load carrying dump body about an approximately vertical axis, means for tilting said load carrying dump body about an approximately horizontal axis and dumping the load from said dump body *through said rear opening,* chute means extending from *said rear opening at* the rear portion of said dump body *a distance great enough* for displacing the point of discharge of the load from the dump body [and] *out to one side of the rails of the railroad which support said vehicle when the rear portion of the dump body faces to one side of the rails, with the lower portion of said tail gate being movable through said chute means,* said means for rotating said load carrying dump body about an approximately vertical axis comprising bearing means mounted on said framework and rotatably supporting said load carrying dump body, a sheave member connected to and rotatable about the approximately vertical axis with said dump body, ram means including a ramrod positioned beneath said bearing means, a pulley member carried by said ram rod, a cable with one of its ends movable with said dump body about the approximately vertical axis and the other of its ends connected to said framework and extending about an arc of said sheave member and said pulley member, and guide means for guiding said cable between the levels of said ram means and said sheave member whereby [distension] *distention* of said ramrod causes the dump body to rotate about the approximately vertical axis for dumping a load from the dump body at various positions about the vehicle.

8. A load carrying vehicle comprising a vehicle framework, a load support framework rotatably mounted on said vehicle framework about an upwardly extending axis, a dump body pivotally mounted on said load support framework about an approximately horizontal axis, means for tipping said dump body about said horizontal axis, said dump body including a bottom pan and front and side walls extending upwardly from said bottom pan and defining a rear opening for dumping its load, a bottom opening tail gate hingedly connected about an approximately horizontal axis to the upper portions of said side walls for selectively opening and closing the rear opening of said dump body, an apron hingedly connected about an approximately horizontal axis to the lower portion of said dump body, a pair of wing plates each hingedly connected at one of its edge portions about an upwardly extending axis at opposite sides of the rear opening of said dump body, and railroad wheels mounted on said vehicle framework and movable up and down with respect to said vehicle framework for engaging the rails of a railroad and supporting the vehicle on a railroad, [whereby] said tailgate, apron and wing plates [are all foldable] *being constructed to fold* with respect to each other inwardly into closed relationship about the rear opening of said dump body, and *when* the dump body is [rotatable] *rotated* about its upwardly extending axis and the tail gate, apron and wing plates are foldable outwardly to form a chute *of size great enough* to guide the load of the dump body out [to] *beyond* the side of the rails of a railroad *on which the vehicle is supported* as the load is dumped.

10. A load carrying vehicle comprising a vehicle framework, road wheels mounted on said vehicle framework for supporting said vehicle framework from a road surface and the like, railroad wheels mounted on said vehicle framework and movable up and down with respect to said vehicle framework for engaging the rails of a railroad, a load support framework, bearing means rotatably supporting said load support framework about an upwardly extending axis, a sheave member connected to said load support framework with its center of rotation concentric with the upwardly extending axis, a first cable connected at one of its ends to said load support framework and extending in a first direction about said sheave member, a second cable connected at one of its ends to said load support framework and extending in a second direction about said sheave member, a pair of fluid actuated rams positioned in parallel, side-by-side relationship beneath said sheave member and each including ram rods distendable from a cylinder, said first and second cables each being engaged at the other of its ends by one of said ram rods, guide means for each of said first and second cables for guiding said cables from the level of said rams to the level of said sheave member, cable housings for receiving each of said cables and said ram rods when said ram rods are distended, a dump body pivotally mounted on said load support framework about a horizontal axis *and defining a rear dump opening, a bottom opening tailgate pivotally mounted at its upper portion to said dump body for opening and closing said rear dump opening*, means for tilting said dump body about said horizontal axis, and chute means connected to said dump body for displacing the point of discharge of the load from the dump body *with the lower portion of said tailgate being movable through said chute means, said chute means being of sufficient size for displacing the load beyond the side of the rails which the railroad wheels engage.*

* * * * *